United States Patent [19]

Takano et al.

[11] Patent Number: 4,710,418

[45] Date of Patent: Dec. 1, 1987

[54] OPTICAL RECORDING MEDIUM

[75] Inventors: Katsuhiko Takano, Yokohama; Satoshi Yoshihara; Shigeharu Iijima, both of Kawasaki; Eizo Sasamori, Yokohama; Masaaki Matsushima, Machida; Hiroyoshi Kishi, Tokyo, all of Japan

[73] Assignee: Canon Kabushiki Kaisha, Tokyo, Japan

[21] Appl. No.: 9,545

[22] Filed: Feb. 2, 1987

Related U.S. Application Data

[63] Continuation of Ser. No. 623,474, Jun. 22, 1984, abandoned.

[30] Foreign Application Priority Data

Jun. 29, 1983 [JP] Japan ................... 58-116157

[51] Int. Cl.⁴ .................. B32B 7/12; B32B 15/04; G01D 9/00
[52] U.S. Cl. ................... 428/192; 346/135.1; 346/137; 428/203; 428/209; 428/210; 428/469; 428/913; 430/945
[58] Field of Search ............. 428/209, 210, 203, 469, 428/913, 192; 427/165, 162, 166; 430/945; 346/135.1, 137

[56] References Cited

U.S. PATENT DOCUMENTS

| 4,284,678 | 8/1981 | Jones | 428/209 X |
| 4,347,265 | 8/1982 | Washo | 427/165 X |
| 4,410,581 | 10/1983 | Nam | 428/210 X |
| 4,435,801 | 3/1984 | Levin | 369/275 |
| 4,543,307 | 9/1985 | Drexler et al. | 430/945 X |

FOREIGN PATENT DOCUMENTS

| 27494 | 2/1982 | Japan | 430/945 |
| 60542 | 4/1982 | Japan | 430/945 |

Primary Examiner—Thomas J. Herbert
Attorney, Agent, or Firm—Fitzpatrick, Cella, Harper & Scinto

[57] ABSTRACT

An optical recording medium comprises a plurality of layers including an optical recording layer laminated on the substrate, said substrate having a region on and around the edge portion thereof where no optical recording layer is formed, and said region being sealed by any of said layers other than said optical recording layer.

6 Claims, 6 Drawing Figures

OPTICAL RECORDING MEDIUM

This application is a continuation of application Ser. No. 623,474 filed June 22, 1984, now abandoned.

BACKGROUND OF THE INVENTION

1. Field of the Invention

This invention relates to an optical recording medium which is capable of performing information recording and reproduction by irradiation of light beam.

2. Description of the Prior Art

As the optical recording medium such as the so-called "optical disc", etc., there have heretofore been known those which are made up of a thin film of alloy of rare earth metals and transition metals; a thin film of reductive oxides such as chalcogen compounds, etc. utilizing a phase transition from amorphous state to crystalline state; heat-mode recording materials; thermoplastic recording materials; and so on, all being used in the form of an optical recording layer. For instance, those which are called the magneto-optical recording medium are made up of polycrystalline thin films such as MnBi, MnCuBi, etc.; amorphous thin films such as GdCo, GdFe, TbFe, DyFe, GdTbFe, TbDyFe, etc.; and single crystal thin films such as GIG (gadolinium-iron-garnet), etc.

Of these thin films, the amorphous thin films are nowadays considered excellent as the optical recording medium taking into account the film forming property at the time of fabricating a thin film of a large area at a temperature in the neighborhood of a room temperature, the write-in efficiency for writing information signals with a small energy of light, and the read-out efficiency for reading the signals as written in with a good S/N ratio. For instance, GdTbFe has a large Kerr rotational angle and a Curie point of 150° C. or so, hence it is suitable for use as the magneto-optical recording medium. As the result of further studies and researches for improving the Kerr rotational angle, it has been found that GdTbFeCo is able to provide the magneto-optical recording medium having a sufficiently large Kerr rotational angle and being capable of performing the read-out operation with good S/N ratio.

However, GdTbFe, GdTbFeCo, and other amorphous magnetic materials have various disadvantages such that they are inferior in the corrosion-resistant property, and are oxidized in an atmosphere containing moisture to bring about deterioration in their magnetic characteristics. The deterioration in the characteristics of the optical recording layer owing to such corrosion has been the common problem with the magneto-optical recording medium as well as the abovementioned optical recording medium.

With a view to solving such disadvantage as mentioned above, there have so far been proposed the optical recording medium of various constructions such as one provided with a protective layer on the optical recording layer, or an air-sandwich structure with an inert gas being sealed in the interior of the recording medium, or a stick-together structure with a protective substrate being adhered onto the optical recording layer. However, the cause for corrosion of the optical recording medium is thought to be due to staining of the substrate, or adhesion of oil and dirt to, or intrusion of moisture and oxygen into, the recording medium during its handling, etc. after the fabrication, and, even with such structure as mentioned above, the corrosion is apt to take place from the end surface of the substrate and to spread inward. On account of this, it has heretofore been the practice to prevent defects in the recorded information and/or extinction of the accumulated information by not using, as the recording part, a portion of the whole optical recording layer usually formed on the entire surface of the substrate, which corresponds to the edge of the substrate. However, once the corrosion starts in one part of the optical recording medium, a local battery is formed in that place, and the corrosion is accelerated around that place, which ultimately proceeds to the recording portion. As the consequence of this, the aforedescribed methods did not give fundamental solution to the corrosion of the optical recording layer.

SUMMARY OF THE INVENTION

It is an object of the present invention to provide an optical recording medium having sufficient corrosion-resistant property.

According to the present invention, there is provided an optical recording medium, wherein a plurality of layers including an optical recording layer are laminated on the substrate, characterized in that said substrate has a region on and around the edge portion thereof where no optical recording layer is formed, and that said region is sealed by any of said layers other than said optical recording layer.

DETAILED DESCRIPTION OF THE PREFERRED EMBODIMENTS

The optical recording medium of the present invention is constructed by forming the optical recording layer on the substrate, except for its edge portion, then laminating other layers than the optical recording layer, and finally sealing the edge portion of the substrate where no recording layer is formed. It should be noted here that the substrate may take any arbitrary shape such as, for example, circular, annular (doughnut-shape), square, rectangular, polygonal, and various other shapes. The region of the substrate having no optical recording layer thereon is defined, for example, at the outer edge portion of the substrate or a part of the outer edge portion thereof. When the substrate has an inside opening as is the case with the doughnut-shaped substrate, the region having no optical recording layer is defined at both outer and inner edge portions of the substrate; or the inner edge portion and a part of the outer edge portion thereof; or the outer edge portion and a part of the inner edge portion thereof; or a part of both outer and inner edge portions thereof; or only the inner edge portion thereof; or only a part of the inner edge portion thereof.

The optical recording medium of the present invention has the following layers in lamination, besides the optical recording layer: a heat insulation layer of organic resins, dyestuffs, pigments, etc.; a single layer of reflection-preventive films of $ZrO_2$, SiO, etc.; multi-layers of reflection-preventive films in lamination selected from any of ZnS, MgF$_2$, Na$_3$AlF$_6$, SiO$_2$, TiO$_2$, ZrO$_2$ films, etc.; and a protective layer of metals, such as Ti, Cr, Zn, Al, etc., Si, or oxides such as TiO$_2$, Al$_2$O$_3$, SiO$_2$, Cr$_2$O$_3$, etc. The abovementioned region where no recording layer is formed is sealed by the protective layer, for example.

The present invention can be applied to the air-sandwich structure and the stick-together structure in combination. For example, in the case of the stick-together structure, the substrate with the optical recording layer formed thereon is stuck together with the protective substrate through an adhesive layer, and the region on the substrate where no recording layer has been formed is sealed by this adhesive layer. In this case, too, it is particularly preferable that those layers other than the optical recording layer, such as the heat insulation layer, the reflection-preventive layer, the protective layer, and so on be also formed commensurate with the range of the recording layer, or be formed larger than the recording layer, but not reaching the edge of the substrate, these layers being covered by the adhesive layer. In this way, the optical recording medium becomes less stainable during its handling and also less influenced by temperature and humidity changes, whereby its corrosion-resistant property improves.

EXAMPLE 1

Figure 1:
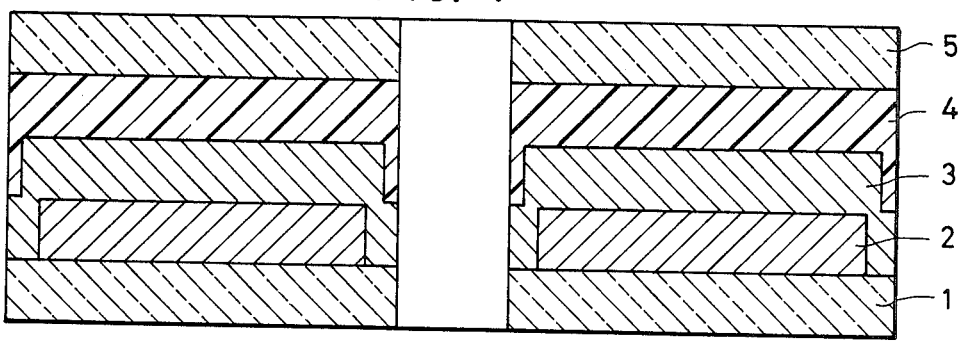
FIGS. 1, 2, 3 and 5 are respectively schematic cross-sections showing structures of the optical recording medium according to preferred embodiment of the present invention.

The optical recording medium of the structure as shown in FIG. 1 was manufactured in the following manner.

The optical recording layer 2 consisting of a thin film of a quaternary type amorphous magnetic alloy of GdTbFeCo was formed by sputtering on the doughnut-shaped glass substrate 1 having an outer diameter of 150 mm and an inner diameter of 20 mm, except for the portions receded by 5 mm each from both outer and inner edges. Then, as the protective layer 3, aluminum was vapor-deposited to a film thickness of 3,000 Å by resistive heating using a vacuum deposition device, and in a manner to cover the optical recording layer 2. The glass substrate 1 with the optical recording layer 2 formed thereon was then stuck together with the protective glass plate 5 by way of the adhesive layer 4 ("BOND E SET M", a tradename of a product sold by Konishi K.K.), thereby obtaining the magneto-optical recording medium. The thus obtained magneto-optical recording medium was placed in a constant temperature and humidity chamber of 45° C. and 95% RH to subject it to the corrosion-resistance test for 1,000 hours. After the test, the optical recording medium was observed with naked eyes.

Figure 4:
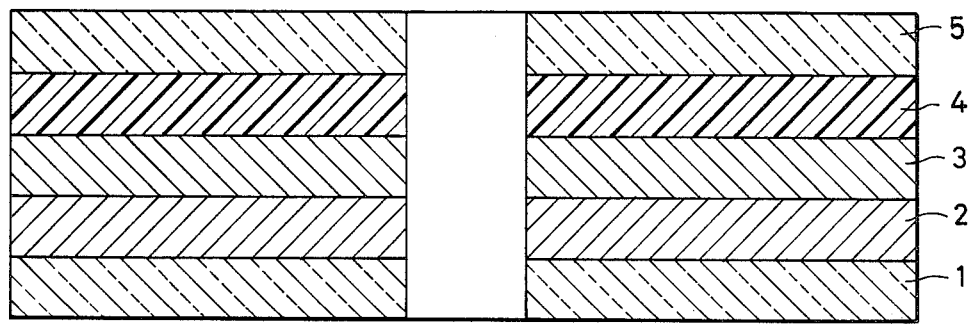
FIGS. 4 and 6 are respectively schematic cross-sections showing structures of the conventional optical recording medium.

For the sake of comparison, a conventional optical recording medium of a construction as shown in FIG. 4, wherein the optical recording layer 2 is provided over the entire surface of the doughnut-shaped substrate, was subjected to the same corrosion-resistance test. (Note should be taken that those parts which are identical with, or corresponding to, those in FIG. 1 are designated by the same reference numerals, and the explanations for them are dispensed with).

The results of the test are as shown in Table 1 below. It will be seen from the Table that the optical recording medium of the present invention having its optical recording layer formed on the substrate with its end being withdrawn by 5 mm from the edge of the substrate is more excellent in its corrosion-resistant property than the conventional one having its optical recording layer formed over the entire surface of the substrate.

EXAMPLE 2

Figure 2:
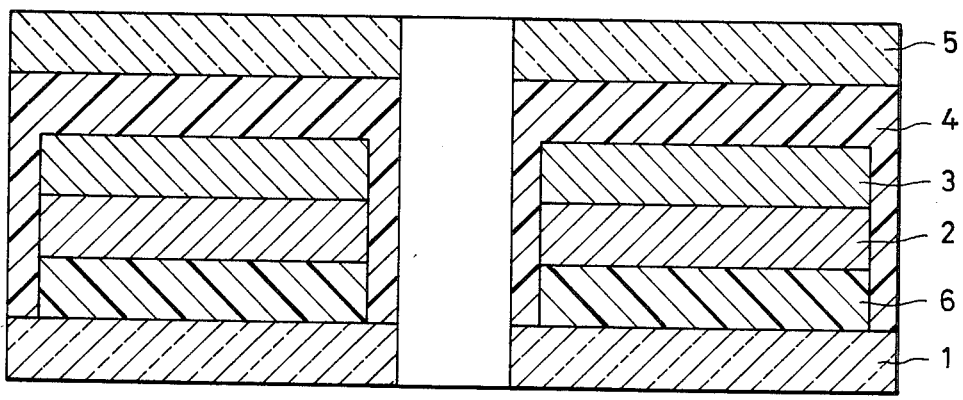

The optical recording medium of the structure as shown in FIG. 2 was manufactured in the following manner.

The heat insulation layer 6 of a urethane type organic resin was formed on the doughnut-shaped glass substrate 1 same as in Example 1 above by the screen printing method, except for the portions thereof withdrawn by 5 mm each from both outer and inner edges. Then, on this heat insulation layer, the optical recording layer 2 consisting of a thin film of quaternary type amorphous magnetic alloy of GdTbFeCo was formed by sputtering. Further, over this optical recording layer, the protective film 3 of aluminum was vapor-deposited to a film thickness of 3,000 Å by resistive heating using the vacuum deposition device. The glass substrate 1 with the optical recording layer 2 formed thereon and the protective glass plate 5 were then stuck together by way of the adhesive laycr 4 ("BOND E SET M", a tradename of a product sold by Konishi K. K.) in a manner to cover the entire layers starting from the heat insulation layer up to and including the protective layer, thereby fabricating the optical recording medium. The thus obtained optical recording medium was placed in a constant temperature and humidity chamber of 45° C. and 95% RH to subject it to the corrosion-resistance test for 1,000 hours. After the test, the optical recording medium was observed with naked eyes. The results are as shown in Table 1 below.

EXAMPLE 3

Figure 3:
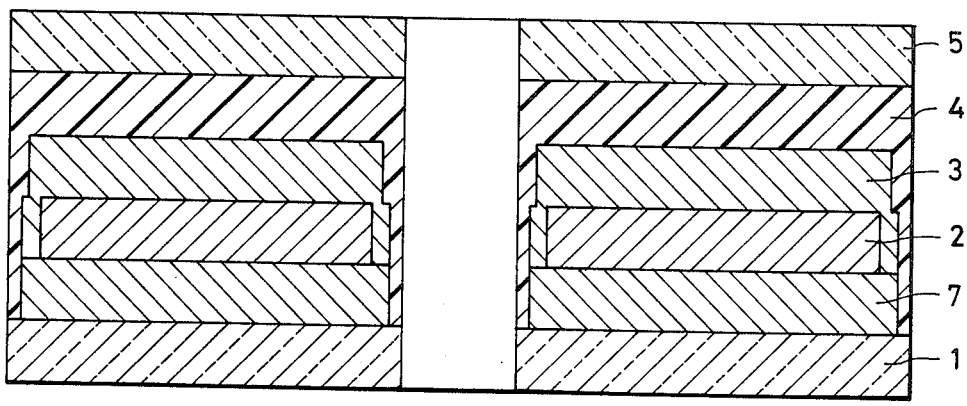

The optical recording medium of the structure as shown in FIG. 3 was manufactured in the following manner.

The reflection-preventive layer 7 of ZrO$_2$ was formed to a film thickness of 1,600 Å on the doughnut-shaped glass substrate 1 same as in Example 1 above by electron beem heating using the vacuum deposition device. Then, on this reflection-preventive layer 7, the optical recording layer 2 consisting of a thin film of a quaternary type amorphous magnetic alloy of GdTbFeCo was formed by sputtering. Subsequently, the aluminum protective layer 3 was formed in the same manner as in Example 2 above. Both reflection-preventive layer 7 and the protective layer 3 were not formed on the portion withdrawn by 2 mm from the edge of the substrate, while the magnetic thin film recording layer was not formed on the portion withdrawnby 5 mm from the edge of the substrate. The glass substrate 1 with the optical recording layer 2 formed thereon and the protective glass plate 5 were then stuck together by way of the adhesive layer 4 ("BOND E SET M", a tradename of a product sold by Konishi K. K.) in a manner to cover the entire layers starting from the reflection-preventive layer 7 up to and including the protective layer 3 with this adhesive layer 4, thereby fabricating the optical recording medium. The thus obtained optical recording medium was placed in a constant temperature and humidity chamber of 45° C. and 95% RH to subject it to the corrosion-resistance test for 1,000 hours. After the test, the optical recording medium was observed with naked eyes. The results are as shown in Table 1 below.

EXAMPLE 4

Figure 5:
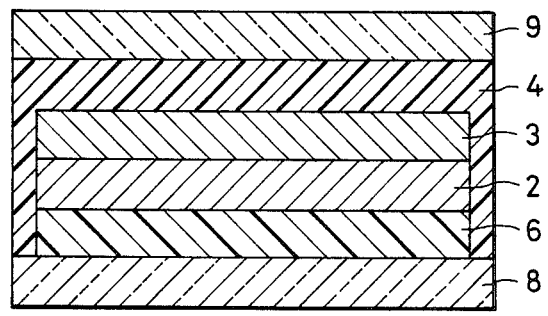

For the substrate and the protective substrate, use was made of square glass plates 8,9 of 100 mm on each side. With these glass plates, the optical recording medium of the structure as shown in FIG. 5 was fabricated in the same manner as in Example 2 above, with the exception that a region of 5 mm wide without the recording layer provided thereon was formed on and along the outer edge of the substrate. This optical recording medium was placed in a constant temperature and humidity chamber of 45° C. and 95% RH to subject it to the corrosion-resistance test for 1,000 hours. After the test, the optical recording medium was observed with naked eyes.

Figure 6:
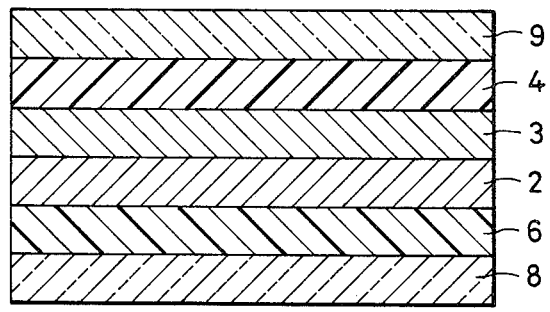

For the sake of comparison, a conventional optical recording medium of the construction as shown in FIG. 6, wherein the same substrate 8 and protective substrate 9 as mentioned above were used, and the optical recording layer 2 was formed over the entire surface of the substrate 8. (It should be noted that those parts in FIGS. 5 and 6 which are identical with, or corresponding to, those in FIG. 2 are designated by the same reference numerals, and the explanations for them are dispensed with.) The results of the test are as shown in Table 1 below.

TABLE 1

| Sample | Results of Corrosion-Resistance Test |
|---|---|
| Ex. 1 (FIG. 1) | No corrosion |
| Ex. 2 (FIG. 2) | No corrosion |
| Ex. 3 (FIG. 4) | No corrosion |
| Conventional (FIG. 4) | Corrosion occurred on both outer and inner edges: maximum corrosion distance of 10 mm from both edges |
| Conventional (FIG. 5) | No corrosion |
| Conventional (FIG. 6) | Corrosion occurred on outer edges, maximum corrosion distance of 15 mm from every edge |

In the foregoing examples the magneto-optical recording medium has been used, but the present invention is not limited to the magneto-optical recording medium alone, but it is applicable to any type of optical recoding mediums using those materials as mentioned in the foregoing description of prior arts.

What we claim is:

1. An optical recording medium, wherein a plurality of layers including an optical recording layer are laminated on the substrate, characterized in that said substrate has a region on and around the edge portion thereof where no optical recording layer is formed, and that said region is sealed by one or more remaining layers other than said optical layer, the remaining layer or layers comprising a thin film of a metal, Si or a compound thereof.

2. The optical recording medium according to claim 1, wherein the remaining layer or layers comprise a thin film of a metal selected from the group consisting of Ti, Cr, Zn and Al.

3. The optical recording medium according to claim 1, wherein the remaining layer or layers comprise a thin film of a compound selected from the group consisting of $TiO_2$, $Al_2O_3$, $SiO_2$, $SiO$, $Cr_2O_3$, $ZrO_2$, AnS, $MgF_2$ and $Na_3AlF_6$.

4. An optical recording medium, comprising:
a substrate; an optical recording layer formed on a region which corresponds to the substrate other than its edge portion; a protective plate; an adhesive layer by which the substrate is joined to the protective plate and by which the region is sealed; and one or more layers other than the optical recording layer, the one or more layers being sandwiched between the optical recording layer and the adhesive layer and comprising a thin film of a metal, Si or a compound thereof.

5. The optical recording medium according to claim 4, wherein the layer or layers other than the optical recording layer comprise a thin film of a metal selected from the group consisting of Ti, Cr, Zn and Al.

6. The optical recording medium according to claim 4, wherein the layer or layers other than the optical recording layer comprise a thin film of a compound selected from the group consisting of $TiO_2$, $Al_2O_3$, $SiO_2$, $SiO$, $Cr_2O_3$, $ZrO_2$, ZnS, $MgF_2$ and $Na_3AlF_6$.

* * * * *

UNITED STATES PATENT AND TRADEMARK OFFICE
CERTIFICATE OF CORRECTION

PATENT NO. : 4,710,418
DATED : December 1, 1987
INVENTOR(S) : KATSUHIKO TAKANO, ET AL.

It is certified that error appears in the above-identified patent and that said Letters Patent is hereby corrected as shown below:

COLUMN 2

Line 67, "ZrO2" should read -- $ZrO_2$ --.

COLUMN 4

Line 20, "laycr" should read --layer--.

COLUMN 6

Line 20, "AnS," should read --ZnS,--.

Signed and Sealed this

Tenth Day of May, 1988

Attest:

DONALD J. QUIGG

Attesting Officer   Commissioner of Patents and Trademarks